United States Patent [19]

Geissler et al.

[11] Patent Number: 4,558,406
[45] Date of Patent: Dec. 10, 1985

[54] TRANSFORMER FOR GENERATING HIGH DC VOLTAGES WITH INTEGRATED MEANS FOR COOLING RECTIFIERS

[75] Inventors: Klaus H. Geissler, Backnang; Herbert Bock, Oppenweiler, both of Fed. Rep. of Germany

[73] Assignee: ANT Nachrichtentechnik GmbH, Backnang, Fed. Rep. of Germany

[21] Appl. No.: 540,874

[22] Filed: Oct. 11, 1983

[30] Foreign Application Priority Data

Oct. 8, 1982 [EP] European Pat. Off. ........ 82109306.9

[51] Int. Cl.⁴ .............................................. H02M 9/00
[52] U.S. Cl. ...................................... 363/126; 336/61; 336/84 C; 363/141
[58] Field of Search .......................... 310/64, 65, 68 R; 336/61, 84 C, 179, 192; 361/386; 363/141, 126, 144

[56] References Cited

U.S. PATENT DOCUMENTS

| | | | |
|---|---|---|---|
| 2,485,745 | 10/1949 | Koone | 336/192 |
| 3,084,299 | 4/1963 | Lord | 336/84 |
| 3,131,331 | 4/1964 | Ray | |
| 3,237,079 | 2/1966 | Mas | 363/126 |
| 3,750,071 | 7/1973 | Eley | 336/84 |
| 3,826,967 | 7/1974 | Wilkinson et al. | |

FOREIGN PATENT DOCUMENTS

| | | |
|---|---|---|
| 2235917 | 2/1973 | Fed. Rep. of Germany . |
| 2818903 | 11/1979 | Fed. Rep. of Germany . |
| 2284173 | 4/1976 | France . |
| 683053 | 11/1952 | United Kingdom ........ 336/61 |

Primary Examiner—Peter S. Wong
Assistant Examiner—D. L. Rebsch
Attorney, Agent, or Firm—Spencer & Frank

[57] ABSTRACT

A transformer arrangement for generating rectified, high voltages has a primary winding wound around the transformer core and is surrounded by a metallic shield. A mass of insulation material, including an insulation layer, surrounds the metallic shield. A secondary winding is embedded in the mass of insulation material outside the insulation layer. The secondary winding has an end terminal carrying a high alternating voltage potential and presents an outer circumference. A heat conducting metal band rests on and covers a major portion of the outer circumference of the secondary winding but does not constitute a short-circuit winding for the transformer. The terminal end of the secondary winding is connected electrically and thermally with a plurality of rectifiers via the metal band.

9 Claims, 10 Drawing Figures

TRANSFORMER FOR GENERATING HIGH DC VOLTAGES WITH INTEGRATED MEANS FOR COOLING RECTIFIERS

BACKGROUND OF THE INVENTION

The present invention relates to a transformer arrangement for generating a rectified high voltage which utilizes a transformer including a primary winding and one or a plurality of secondary windings. The primary winding is closest to the transformer core, with a metallic shield thereabove and a main insulation layer surrounding the shield. The secondary windings are arranged above the main insulation layer and are likewise embedded in an insulation material. The terminal ends of the secondary windings are electrically coupled with rectifiers.

When designing high voltage transformers with connected rectifiers, there arises the problem of dissipating the heat generated in spots by the rectifiers at their diode interface. Thermally satisfactory solution can be realized by installation of the rectifiers in gas, air or liquid cooled systems or by using very expensive materials, e.g. diamonds or berrylium oxide. For small units of high power density, liquid or gas cooled systems involve high additional expenditures and excessive weight. Moreover, special measures are required with respect to operational reliability and maintenance.

When high direct voltages are generated by compact devices, for example for the power supply of transmitting amplifiers in the communications art, particularly for the supply of traveling wave tubes in mobile use in air and space travel, the above-mentioned cooling measures are impractical.

In addition to cooling the rectifiers, sufficient insulation of the high voltage rectifiers must also be assured. It is known in principle, for example, from German Offenlegungsschrift No. 2,818,903 to encase high voltage rectifiers and transformer windings jointly in insulation material, e.g. synthetic resin. However, German Offenlegungsschrift No. 2,818,903 does not give any suggestions as to how, in addition to sufficient insulation, it is possible to realize favorable and effective dissipation of the heat generated by the rectifiers.

SUMMARY OF THE INVENTION

It is therefore an object of the present invention to design an arrangement of the above-mentioned type so that, in addition to sufficient insulation, favorable dissipation of the heat generated by the rectifiers is assured.

This is accomplished by the present invention in which a transformer arrangement is provided for generating rectified, high voltages. The arrangement includes a transformer core with a primary winding wound around the core. A metallic shield surrounds the primary winding and a high voltage insulation layer surrounds the metallic shield. Outside the high voltage insulation layer at least one secondary winding is positioned having at least one terminal end carrying a high alternating voltage potential and presenting an outer circumference. At least one heat conducting metal band rests on and covers a major portion of the outer circumference of the at least one secondary winding but does not constitute a short-circuit winding for the transformer. The at least one terminal end of the at least one secondary winding is connected electrically and thermally with at least one rectifier via the at least one metal band. The four entities, namely the metallic shield, high voltage insulation, secondary winding, and heat conducting metal band are thermally coupled by a suitable dielectric potting material.

The present invention is based on a uniform distribution of the heat, which originates spot-wise at the semiconductor junction of the rectifiers, over the entire circumference of the secondary windings via the heat conducting metal bands. Due to the azimuthal distribution of the heat, a large area is available for its removal. The heat generated by the rectifiers is thus conducted with low density of thermal flux through the main insulation layer, which is hardly charged with alternating voltage, to the metallic shield between the primary and secondary windings of the transformer. Aside from its electrical purpose, the metallic shield serves as a cooling cylinder which conducts the heat out from the inside of the coil assembly to the transformer housing and mounting plate, respectively. Since the metal band has approximately the same voltage as the outermost winding layer of the secondary, no more insulation need be provided between it and the last winding layer than the insulation employed between the individual winding layers of the secondary windings. No high voltage builds up between the metal band and the outer winding layer of the secondary. The installation of the rectifiers in accordance with the present invention thus has the advantage that stray capacitances are reduced to the lowest possible amount. The arrangement is particularly suitable for voltage converters including, for example, switching regulators operating at high switching frequencies.

The arrangement according to the present invention also permits high power density in a compact design. It is particularly suitable for the generation of high voltages since the alternating voltage insulation of the rectifier is effected in small linearized steps due to the stepwise voltage build-up in the individual winding layers.

DESCRIPTION OF THE PREFERRED EMBODIMENTS

Figure 1:
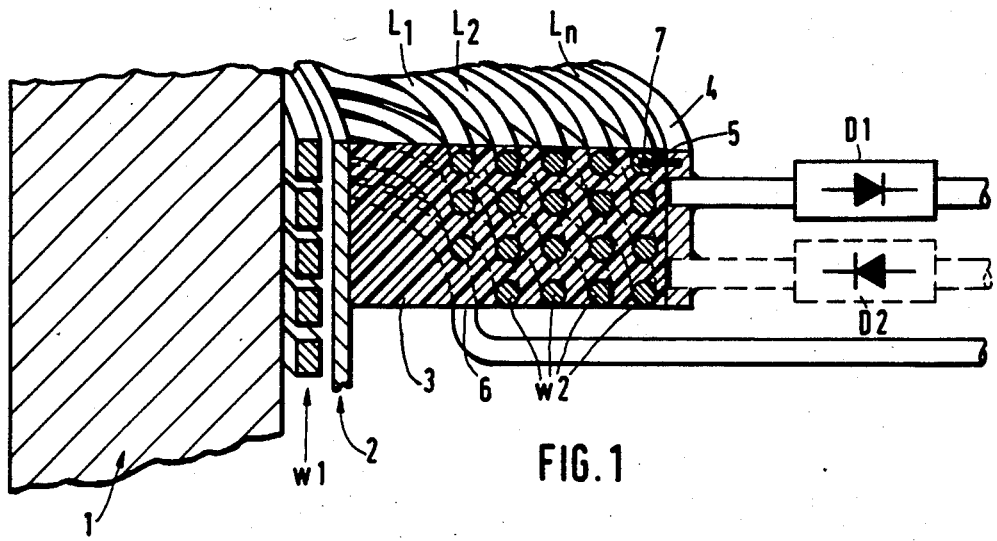
FIG. 1 is a partial side sectional view showing components of the transformer arrangement according to the invention.
Figure 4:
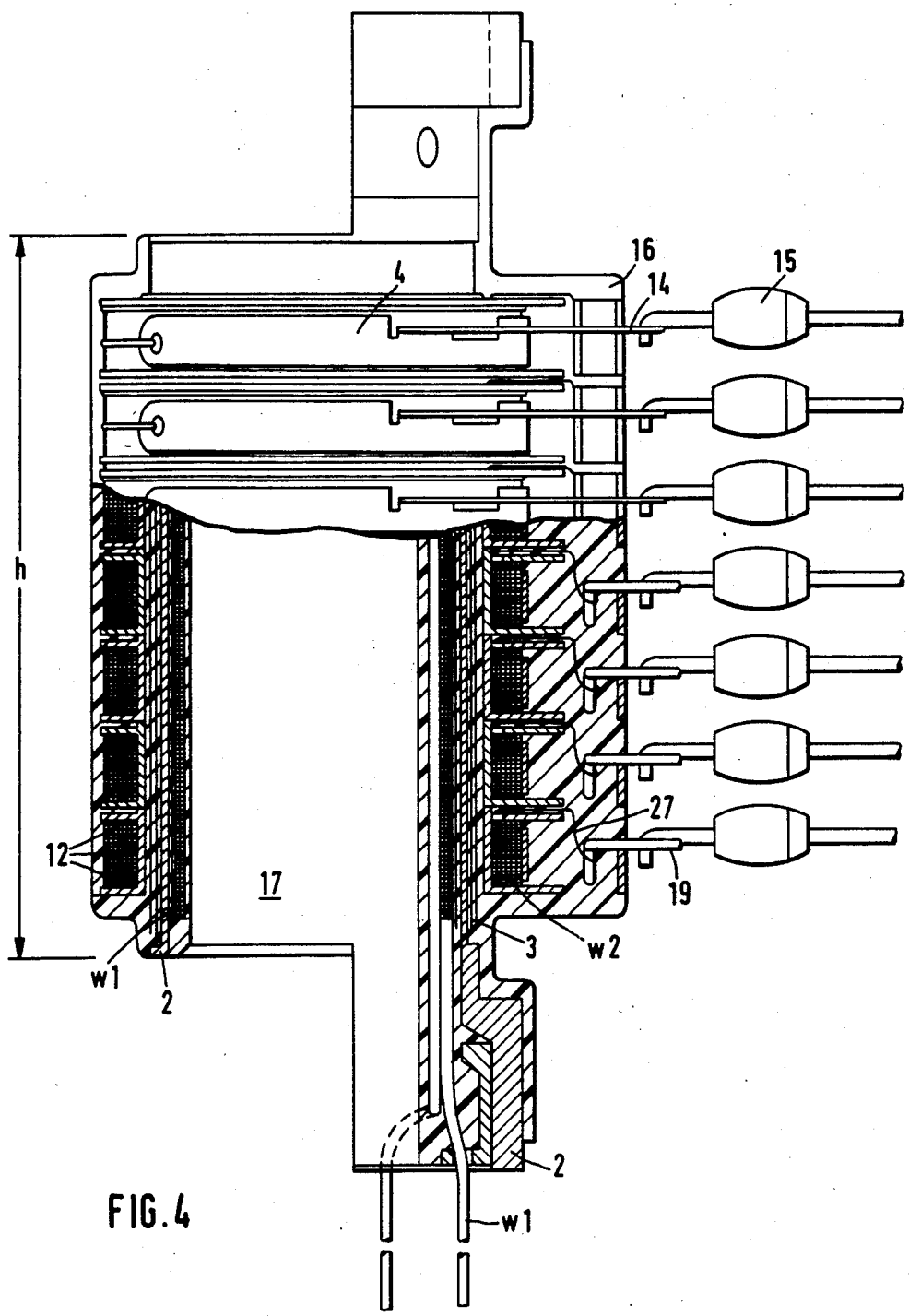
FIG. 4 is a side sectional view of an embodiment of a transformer arrangement according to the invention, drawn to scale.
Figure 5:
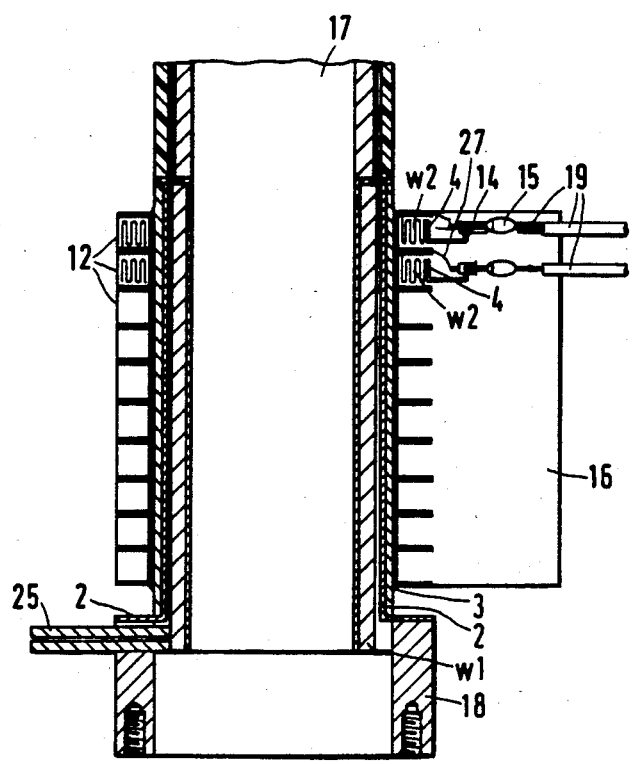
FIG. 5 is a side sectional view of a transformer arrangement according to an alternative embodiment of the invention.

FIG. 1 shows a transformer arrangement according to the invention which includes the basic structure of a transformer in cylindrical form in which a cylindrical transformer core 1 is surrounded by a primary winding w1 embedded in insulation material (not shown) in a conventional manner. A metallic shield 2 is placed around primary winding w1. Metallic shield 2 is preferably connected, as shown in FIG. 4 or 5, with the transformer housing 25 and base 18, respectively. Shield 2 serves as an electrostatic shield and, to conduct the heat generated by the transformer arrangement out of the transformer. A main insulation layer 3, made of, for example, Makrolon (Trademark for polycarbonate resins) embedded in potting of e.g. epoxy resin, surrounds metallic shield 2. Insulation layer 3 is concentrically surrounded by a secondary winding w2, which is likewise embedded in insulation material, e.g. potting. Secondary winding w2 is composed of individual winding layers $L_1, L_2, \ldots L_n$ (FIG. 1). Insulation material between outer winding layer $L_n$ of secondary winding w2 and metal band 4 is of the same thickness as the insulation material between the individual layers $L_1$ through $L_n$.

The terminal end 7 of secondary winding w2 which carries high alternating voltage potential is connected to metal band 4 via an electrical bridge 5. At least one, but preferably two rectifier elements D1 and D2 are soldered to metal band 4 so as to be in good thermal and electrical contact with metal band 4. Spot-wise occurring heat from rectifiers D1 and D2 is conducted to metal band 4, which is preferably made of copper, and thus is uniformly distributed around the outer circumference of the secondary winding w2. From there, the heat is transported with low density heat flux through secondary winding w2 and main insulation layer 3 to metal shield 2 which conducts the heat out of the coil assembly.

Figure 2:
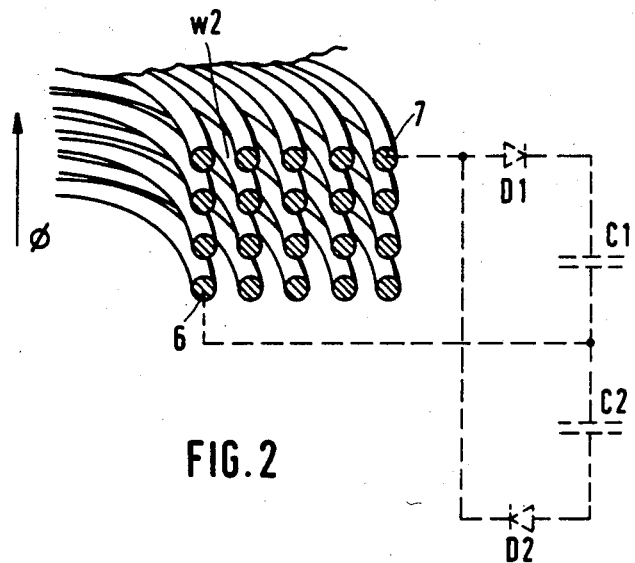
FIG. 2 is a partial side sectional view of components in FIG. 1 combined with a circuit schematic according to the transformer arrngement of the invention.

In principle, only one rectifier, for example D1, is required to generate a rectified high voltage. The rectified high voltage is tapped between the electrode of D1 facing away from metal band 4 and the winding end 6 of secondary winding w2 not connected with metal band 4. If two rectifiers D1 and D2 are connected to metal band 4, these should preferably be connected in a voltage doubler circuit as shown in FIG. 2. In this case the starting wire 6 of secondary winding w2 remote from metal band 4 is connected, via a first capacitance C1, with the cathode of rectifier D1 and, via a second capacitance C2, with the anode of rectifier D2. The connection of the anode of D1 and the cathode of D2 is provided by metal band 4, as shown in FIG. 1. The latter connection point is connected to the terminal end 7 of secondary winding w2 which carries a high alternating voltage potential, as can also be seen in FIG. 1.

Figure 3A:
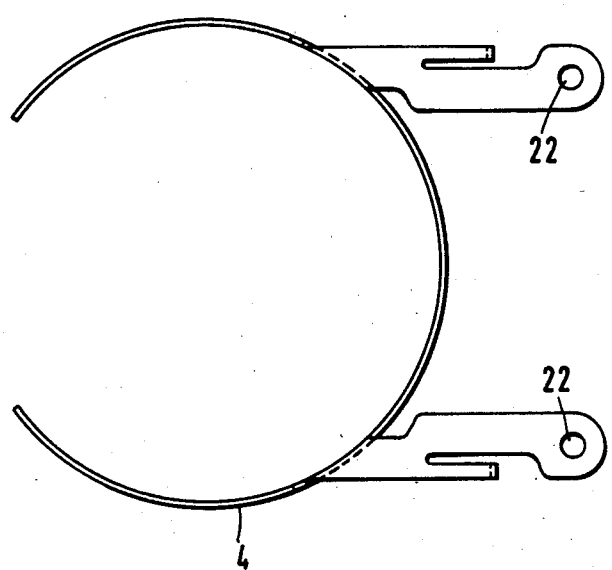
FIGS. 3a and 3b are an embodiment of the metal band which provides cooling for the diodes according to the invention.
Figure 3B:
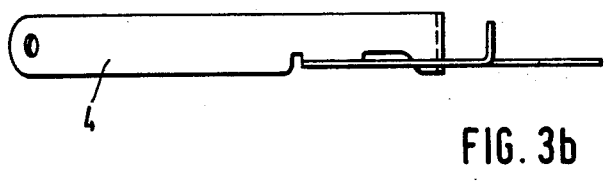

FIG. 2 also shows the direction of magnetic flux $\phi$ with respect to secondary winding w2. When there is a change in flux over time, a voltage U builds up between winding ends 6 and 7 in equal steps of, for example, if w2 consists of 20 turns, as shown in FIG. 2, the step from turn to turn is U/20, and U/5 from winding layer to winding layer, respectively. Relative to winding end 6, the voltage of winding end 7 oscillates between $-U$ and $+U$ at a total amplitude of 2U. The electrodes of rectifiers D1 and D2 connected with winding end 7 oscillate between the same voltages while the alternating voltage amplitude at the rectifier electrodes connected with capacitors C1 and C2, respectively, equals 0. The electrodes of rectifiers D1 and D2 carrying alternating voltage potential are soldered to heat conducting metal band 4. Metal band 4 has approximately the same voltage swing as the last winding layer of secondary winding w2 and therefore the insulation requirements are the same as for the insulation provided between the layers. FIGS. 3a and 3b show one embodiment of the metal band 4 in FIG. 1. The material of metal band 4 is copper 0.25 mm thick. For improved soldering capability, metal band 4 is tin plated. The leads of the rectifying diodes to be cooled are soldered into the holes 22 in FIG. 3. Width, thickness and the general shape may be varied according to special requirements, however, the metal band must not form a short circuit winding for the transformer. In FIG. 3 a 70° gap is provided for this reason.

FIG. 4 shows the total structure of an exemplary embodiment of a transformer arrangement according to the present invention in which a plurality of chambers 12 are each disposed for accommodating a secondary winding w2. The outer winding ends of secondary windings w2 carrying alternating voltage potential are each connected with a respective one of the rectifiers 15 via metal band 4. Wire connections 27 connect the inner winding ends of secondary windings w2 not carrying alternating voltage potential with terminal cables cables 19 in FIG. 4. Clamps 14 are part of the metal band of FIG. 3 and serve as mounts for the rectifiers. In the embodiment of FIG. 4, metal bands 4 are embedded in a potting material 16, while the diodes 15 are outside of the potting. Primary winding w1 is disposed adjacent the core hole 17 of the transformer. Primary winding w1 is surrounded by a metallic shield 2 which is itself supported by a base or by a transformer housing not shown. Main insulation layer 3 is disposed between metallic shield 2 and chambers 12 for secondary windings w2. The thickness of this insulation may be selected according to the requiremt of the application of the transformer. In the embodiment of FIG. 4, rectifiers 15 are arranged perpendicularly with respect to the longitudinal axis of the transformer. FIG. 4 is drawn to scale. All dimensions may be derived from this drawing. As reference the height, h, is 49 mm. The core hole 17 has a basic diameter of 73 mm which, however, is reduced by a segment accomodating the input leads of primary wind w1.

The embodiment of FIG. 5 shows a transformer similar to the design of FIG 4. However, here metal band 4 and diodes 5 are embedded into the same insulation material into which the secondary windings are also embedded. This provides a space saving and presents a more compact and rigid design for certain applications.

Figure 6:
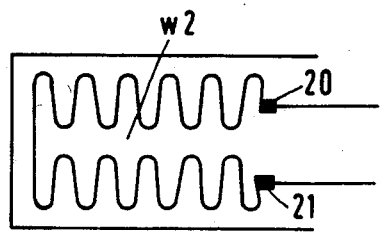
FIG. 6 is a schematic showing a special secondary winding pattern in accordance with the invention, serving in a full wave rectification scheme.

FIG. 6 is a schematic showing the principle of laying out the windings in the radial direction of the secondary for the outputs carrying alternating voltage potential. The windings are placed in such a way that ends 20, 21 carrying alternating voltage potential always lie at the outer circumference of secondary winding w2.

Figure 7:
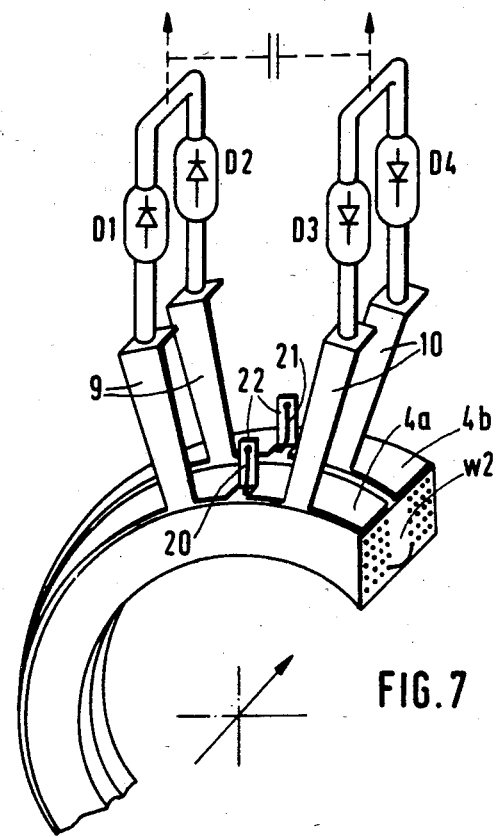
FIG. 7 is a perspective view in partial side section of components of a transformer arrangement according to FIG. 6.

FIG. 7 shows the connection of a secondary winding w2 with a full wave rectification bridge circuit including rectifiers D1, D2, D3 and D4. Secondary winding w2 is wound in the manner shown in FIG. 6 and each winding end 20 and 21 is connected with a respective one of metal bands 4a and 4b. To facilitate installation of the rectifiers, metal bands 4a and 4b are each provided with projections 9 and 10 (corresponding to clamps 14 in FIG. 4) which project perpendicularly from metal bands 4a and 4b and are angled at their ends. The angled ends of projections 9 and 10 are provided with bores into which are soldered the electrodes of the rectifiers. Further projections 22 serve to contact winding ends 20 and 21 carrying alternating voltage potential.

Figure 8:
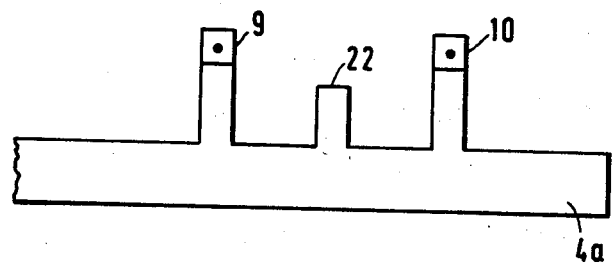
FIG. 8 is a side elevational view of a flattened metal band differing from FIG. 3 for use in the embodiment of the invention shown in FIG. 7.

FIG. 8 shows an unwound metal band 4a with projections 9 and 10 for the rectifier electrodes and a projection 22 for the winding end.

Figure 9:
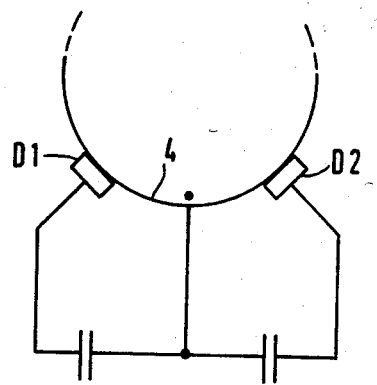
FIG. 9 is a partial circuit schematic of components of another embodiment of a transformer arrangement according to the invention.

FIG. 9 is a schematic representation of an embodiment employing planar rectifiers D1' and D2'. The planar electrodes of rectifiers D1' and D2' are in direct electrical and thermal contact with metal band 4. This assures a very good heat transfer and significantly reduces the heat current density upon transition from the rectifiers to the metal band.

It will be understood that the above description of the present invention is susceptible to various modifications, changes and adaptations, and the same are intended to be comprehended within the meaning and range of equivalents of the appended claims.

What is claimed is:

1. A transformer arrangement for generating a high DC-voltage and having an integrated cooling arrangement comprising:
    a transformer core;
    a primary winding wound around said core;
    a metallic shield surrounding said primary winding and being arranged for conducting heat out of said transformer;
    a mass of insulation material including an insulation layer surrounding said metallic shield;
    at least one secondary winding embedded in said mass of insulation material outside said insulation layer, said at least one secondary winding having an outer circumference and a terminal end carrying a high alternating voltage potential disposed at said outer circumference;
    at least one rectifier; and
    at least one heat conducting metal band resting on and covering a major portion of the outer circumference of said at least one secondary winding but not constituting a short-circuit winding for said transformer, said terminal end of said at least one secondary winding being connected electrically and thermally with said at least one rectifier via said at least one metal band.

2. An arrangement as defined in claim 1, wherein said at least one rectifier and said at least one metal band are embedded in said mass of insulation material.

3. An arrangement as defined in claim 1, wherein said at least one secondary winding has an outer winding layer and said at least one metal band is attached to said outer winding layer so that a good heat transfer is established between said at least one metal band and said at least one secondary winding.

4. An arrangement as defined in claim 1, wherein only said terminal end disposed at the outer circumference of said at least one secondary winding carries alternating voltage potential.

5. An arrangement as defined in claim 4, wherein said at least one metal band includes at least one projection for connection to said terminal end.

6. An arrangement as defined in claim 1, wherein said at least one metal band includes at least one projection for connection to said at least one rectifier.

7. An arrangement as defined in claim 1, wherein said at least one secondary winding has individual winding layers and an outermost winding layer, and said mass of insulation material has a thickness between said outermost winding layer and said at least one metal band which is the same as the thickness of said mass of insulation material between the individual layers of said at least one secondary winding.

8. An arrangement as defined in claim 1, wherein said at least one rectifier has an electrode and said at least one metal band is connected with the electrode of said at least one rectifier.

9. An arrangement as defined in claim 1, wherein said at least one secondary winding includes a plurality of secondary windings each having an outer circumference and a terminal end carrying a high alternating voltage disposed at a respective one of said outer circumferences, said at least one rectifier includes a plurality of rectifiers and said at least one heat conducting metal band includes a plurality of heat conducting metal bands each resting on and covering a major portion of a respective one of the outer circumferences of said secondary windings so as not to constitute a short-circuit winding for said transformer, said terminal ends each being connected electrically and thermally with a respective one of said rectifiers via a respective one of said metal bands.

* * * * *